United States Patent Office 3,412,237
Patented Nov. 19, 1968

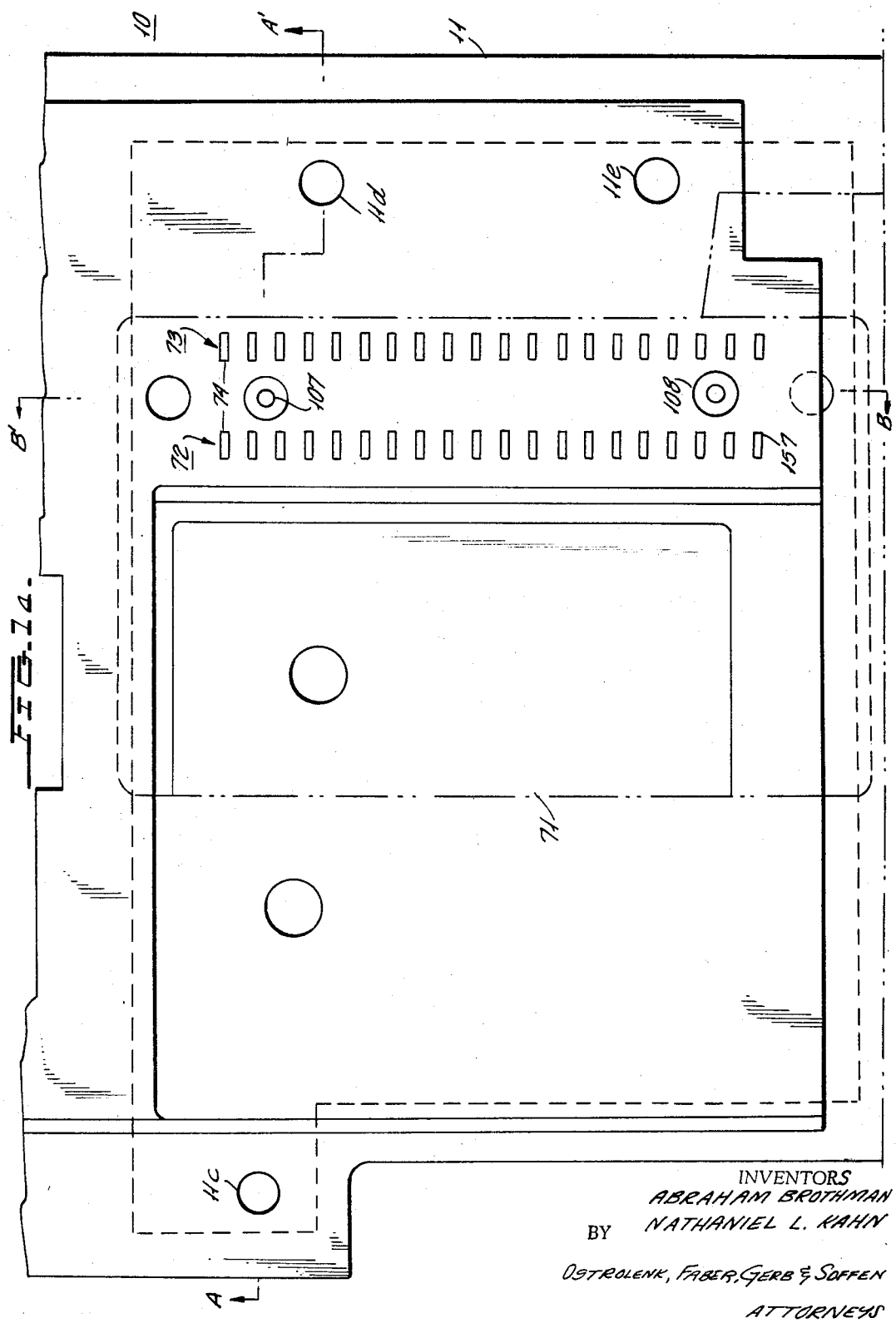

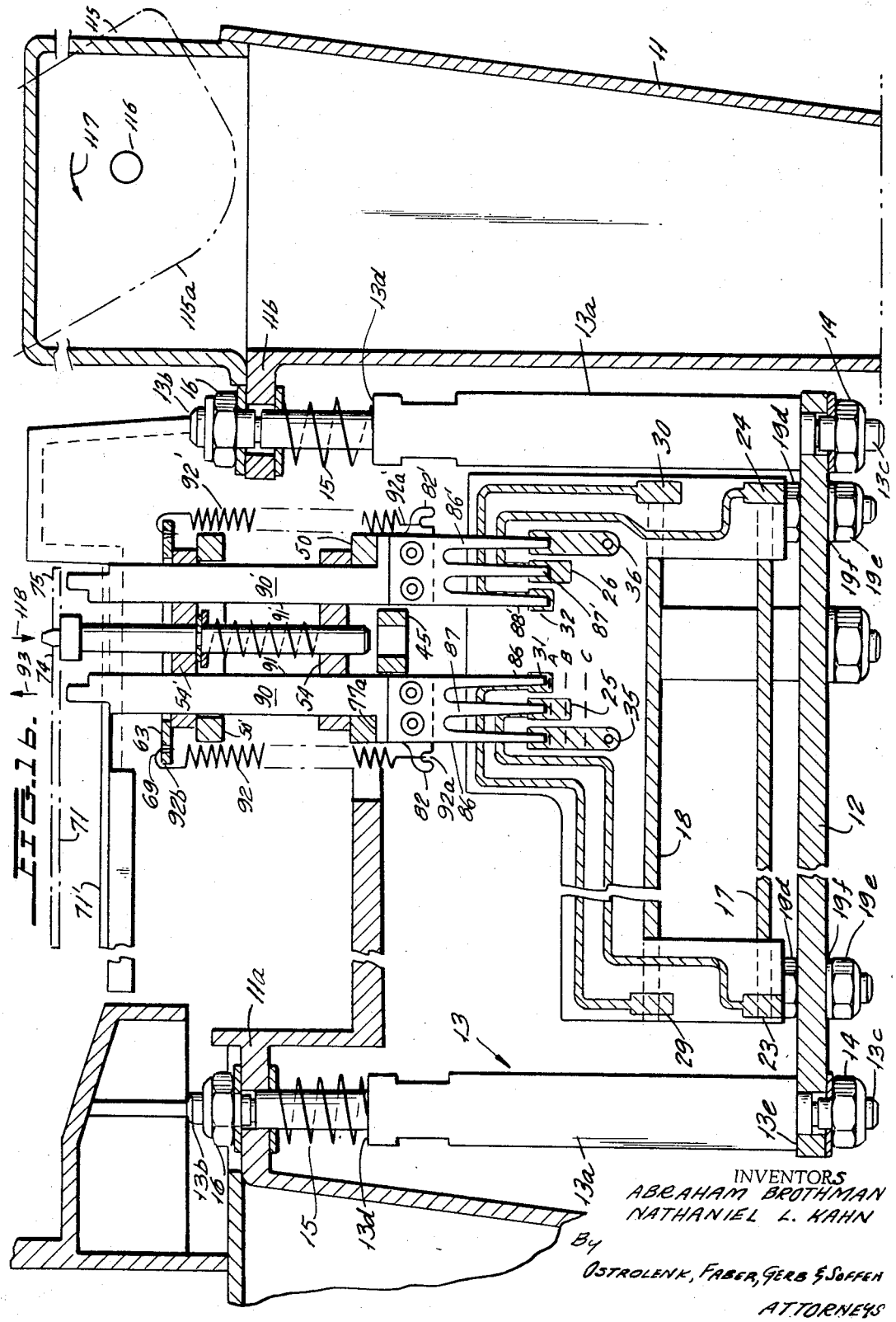

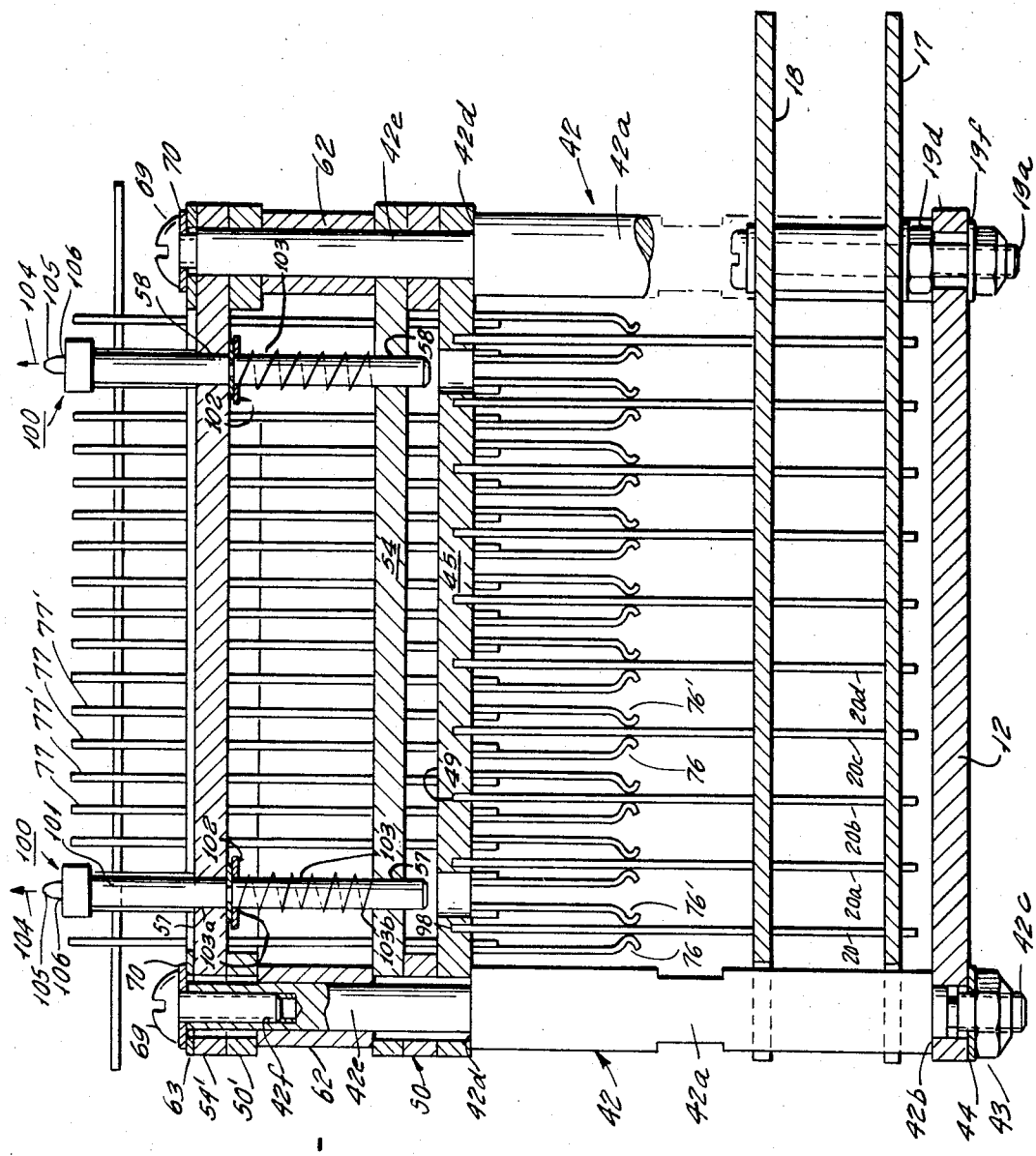

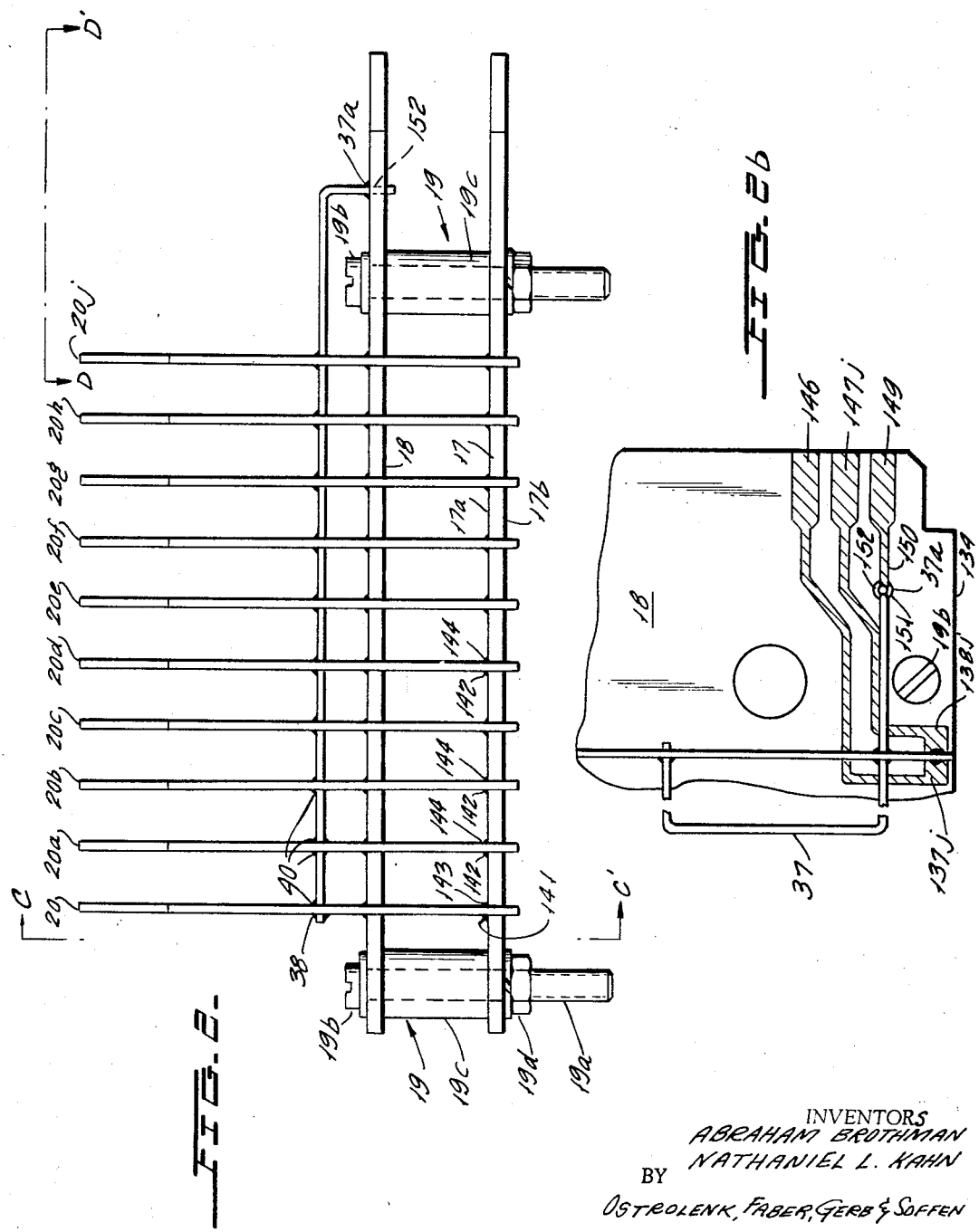

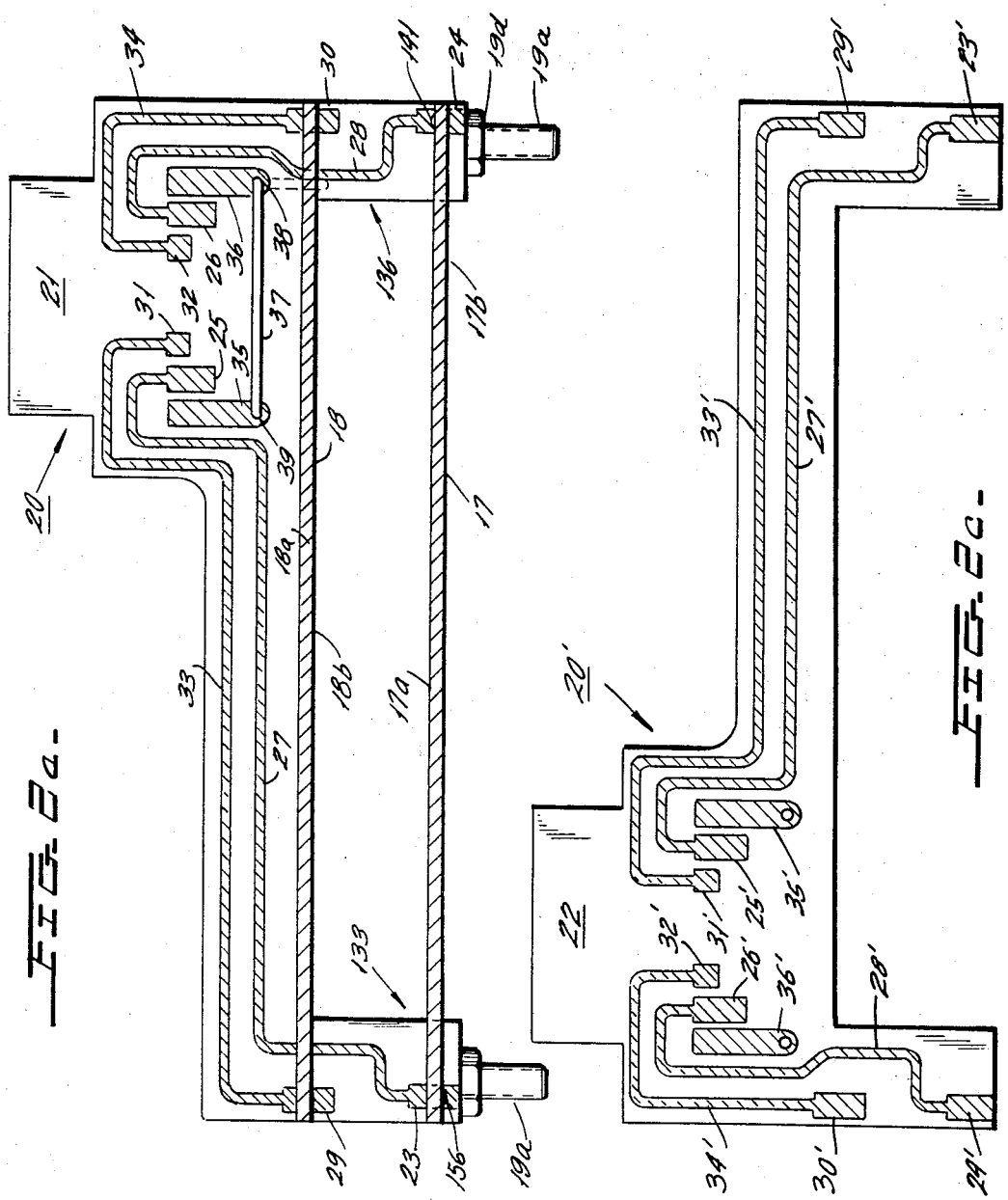

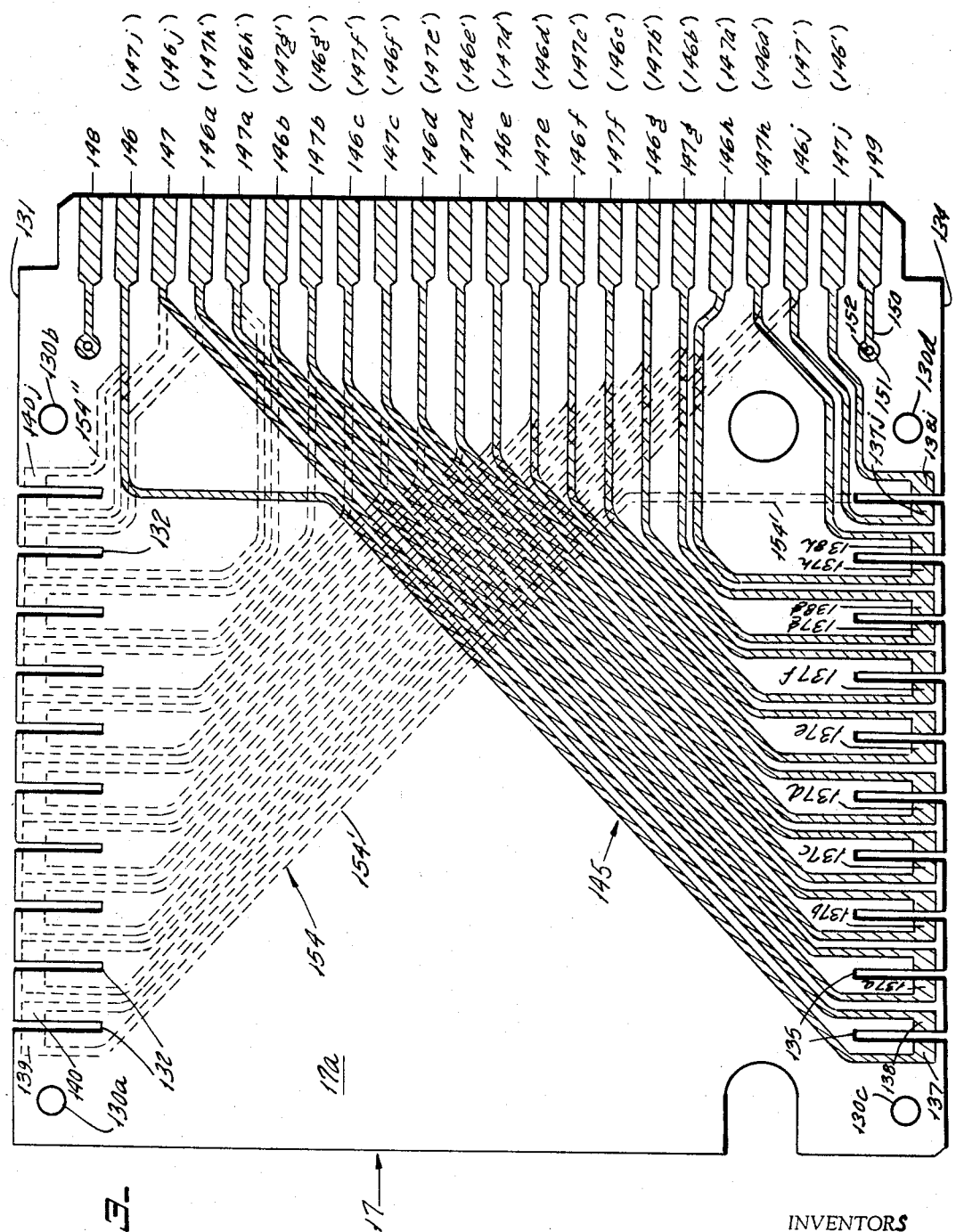

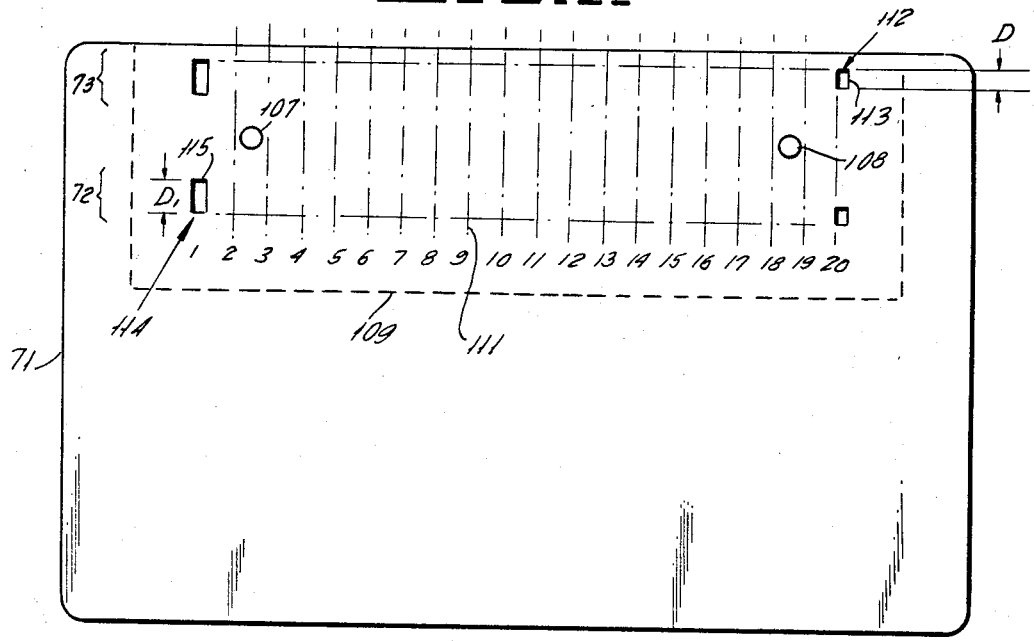
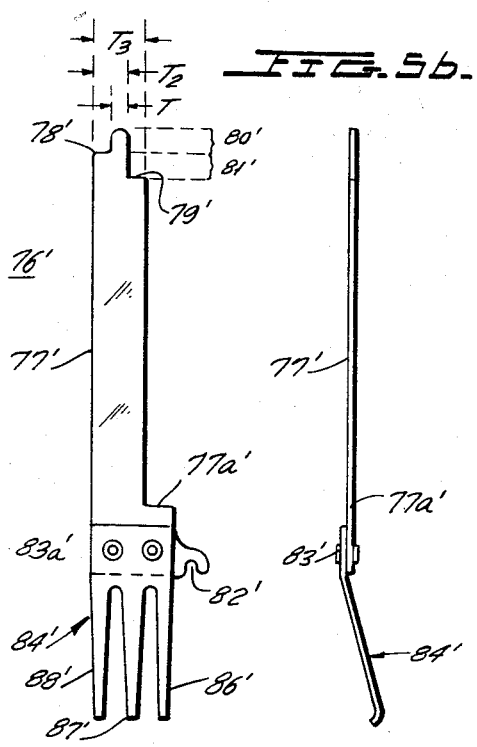
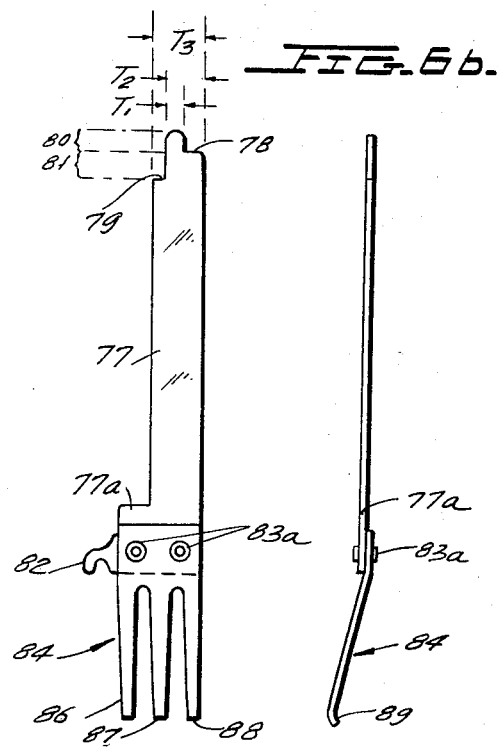

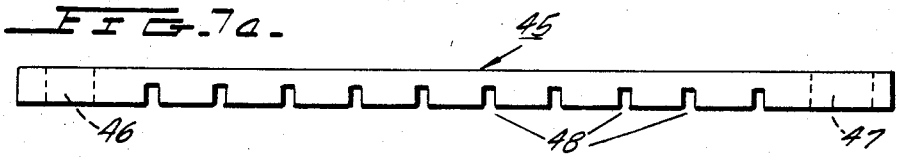
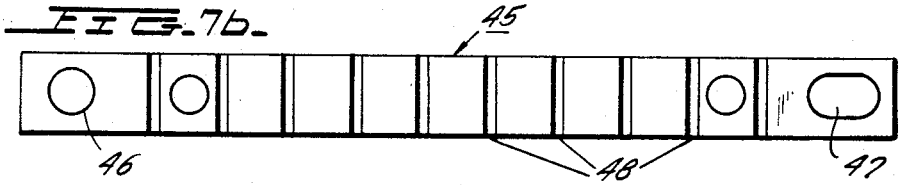
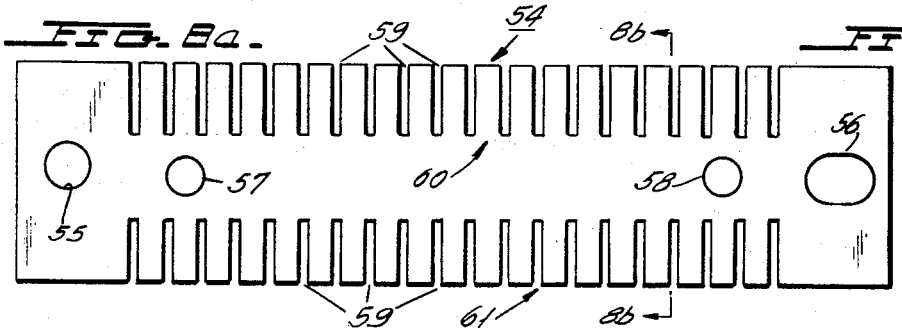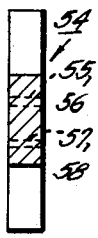
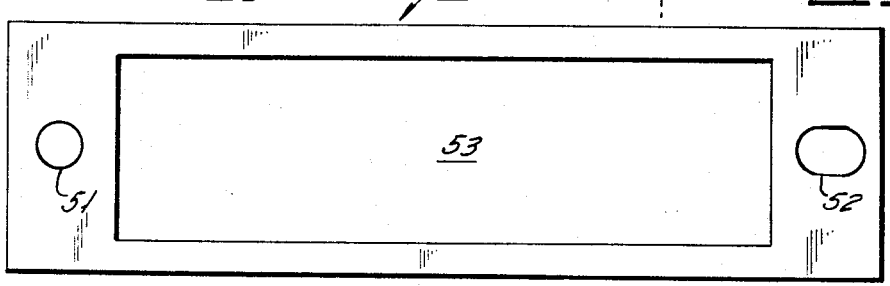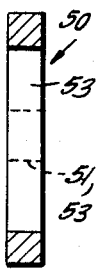
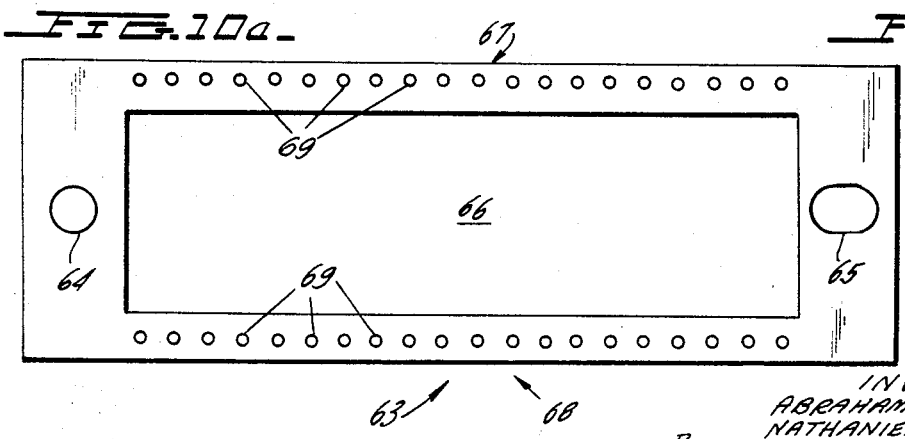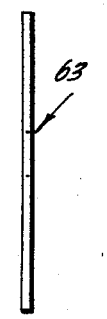

3,412,237
CARD READER MEANS
Abraham Brothman, Dumont, and Nathaniel L. Kahn, Glen Rock, N.J., assignors, by mesne assignments, to Sangamo Electric Company, Springfield, Ill., a corporation of Delaware
Filed Mar. 6, 1964, Ser. No. 349,983
12 Claims. (Cl. 235—61.11)

ABSTRACT OF THE DISCLOSURE

Electromechanical card reading device for converting punched card information into electrical signals using a plurality of rows with each row having a predetermined number of sensing fingers, the sensing portion of each finger having three discrete thicknesses and thereby being capable of assuming three different physical positions in readout of a card, the different physical positions completing different electrical circuits to effect transmission of different information bits.

---

The instant invention relates to reading means, and more particularly to a novel electromechanical reading means for converting data presented in punched form upon cards and the like into electronic signals capable of being transmitted at relatively high speeds to remote locations.

A wide variety of business applications find it advantageous to provide communication means capable of transmitting data from a plurality of remote points to a central location. One typical example of such a business application is that of transmitting credit information from a remote point to a central location. For example, in the case where a purchaser desires credit for the purchase of gasoline and other auto accessories at a local gas station, it is desirable to provide a communications link between the gas station which is designated as a remote location and a central processing point in order to transmit information from the remote location to the central location in the form of the customer's identification number and the size or amount of the purchase. This information, upon receipt by the central location, is processed in a large scale business computer to ascertain the credit rating of the customer or whether, in fact, the particular identification card presented to the gas station attendant has been reported lost or stolen. After appropriate processing, the central location transmits information back to the remote location to approve or disapprove of the request for credit purchase, or, in the alternative, to notify the attendant of the fact that the particular credit card presented has been reported either lost or stolen by its rightful owner.

A system capable of performing the above described functions is fully set forth in copending U.S. application Ser. No. 241,917, now Patent No. 3,328,758, entitled "Credit Check System," filed by A. Brothman et al., and assigned to the assignee of the instant invention. In the system described in the above mentioned copending application, the credit card presented to the attendant is placed in an imprinter mechanism which is employed for the purpose of converting the customer identification number into electronic signals as well as converting the amount of the potential purchase for which credit is desired into electrical signals, all of which information is transmitted to the central location.

A variety of card reading and converting means are described, such as, for example, magnetic sensing means and photoelectric sensing means, to name just a few. In networks of the type described above, it is necessary to provide a card sensing means which is accurate, reliable and yet relatively inexpensive, due to the fact that such a vast network requires an extremely large number of such card sensing means, and if the cost of individual sensing means is quite large, this would make the cost of the overall network prohibitive.

It is, therefore, one object of the instant invention to provide a novel electromechanical card sensing and reading means capable of accurately and reliably converting card information into electrical signals while at the same time providing an arrangement which is relatively inexpensive as compared with such present-day card readers.

The card reader of the instant invention is comprised of a plurality of reciprocally mounted sensing fingers arranged in a plurality of rows with each row having a predetermined number of sensing fingers comprising the row. All of the sensing fingers are biased in a first direction. Positioned in close proximity to the sensing fingers are reciprocally mounted guide means provided to align the card to be read into the correct position relative to the rows of sensing fingers. In the particular embodiment described herein, the card which the card reading means is designed to accept has the dimension of the typical card presently employed by gasoline companies, as well as many other credit organizations. The credit card used with the instant invention may be distinguished from present-day credit cards only from the presence of slots of predetermined dimensions and numbers with the size of the slots and the number of slots employed being the coded representation of the card owner's identification number.

The first ends of the sensing means are designed to come into physical engagement with the credit card to be sensed, while the opposite ends of the sensing fingers are designed to make electrical engagement in a predetermined pattern with specially designed printed circuit means.

Each sensing finger is provided with first and second notched portions on opposite sides thereof so as to form shoulders on opposite sides of the sensing finger first end with one of said shoulders being off-set relative to the other, thus forming a sensing finger which tapers in a staggered manner. Each sensing finger first end may be considered to have three discrete thicknesses. From the extreme tip of the sensing fingers to a first predetermined distance away from the extreme tip, each sensing finger has a first thickness; from said first predetermined distance to a second predetermined distance; the sensing finger has a second thickness substantially greater than said first thickness; and the remaining portion of said sensing finger from the second predetermined distance to substantially the opposite end thereof, the sensing finger has a third thickness substantially greater than both said first and second thicknesses. Each sensing finger is biased in such a manner so as to urge the sensing finger in the direction towards its first end. The card to be read is pressed down upon the first ends of the sensing fingers, acting to urge the sensing fingers against the direction in which they are normally biased. If the card is provided with a slot immediately above an associated sensing finger with the length of the slot being greater than the first thickness of the sensing finger, but less than the second thickness of the sensing finger, the sensing finger will protrude through the slot by a distance approximately equal to said first predetermined distance. If the slot length is greater than said sensing finger thickness, but less than said sensing finger third thickness, then the sensing finger will protrude through the slot a distance substantially equal to said second predetermined distance. Naturally, if no slot whatsoever is provided, the sensing finger will make contact with the underside of the card to be read, and thus will be depressed to its extreme downward position.

The opposite end of each sensing member is provided with a plurality of contact fingers which make wiping contact with associated terminals on said printed circuit means.

As can be seen from the above description, each sensing finger is capable of assuming three predetermined physical positions. The terminals of the printed circuit means are so designed as to reflect the three positions or states by causing the contact fingers to connect all of said terminals for isolating all of said terminals in a predetermined manner in accordance with the position or state of each sensing finger. Similar printed circuit means is provided for each of said sensing fingers.

The electrical states of each of said printed circuit means associated with the sensing fingers are connected to a main or master printed circuit means which is so arranged as to make all of said electrical signals available at substantially one position of said card reader device enabling all of the electrical signals to be simply and readily connected to suitable transmitter means for either sequential or simultaneous transmission of the data to the central location. The main printed circuit means also serves the additional function of providing the support for the individual printed circuit means associated with the sensing fingers by providing suitable slots for making both mechanical and electrical connections with the individual printed circuit means, said slots providing the mechanical support as well as the electrical engagement between said main and said individual printed circuit means. The overall arrangement is extremely compact and is comprised of a minimum number of components, thus greatly simplifying its fabrication, assembly and maintenance. The use of printed circuit means to establish the electrical paths greatly reduces maintenance and repair costs thereof. The overall design further makes the card reading mechanism readily adaptable for use in existing credit card imprinter mechanisms with only very minor alterations being needed to integrate the card reader means into such present-day imprinter mechanisms. By simple physical design adjustment of the sensing finger location, the card reader may be employed for reading cards of varying dimensions and configurations with such modifications being well within the purview of ordinary mechanical skill.

It is, therefore, one object of the instant invention to provide novel card reading means for converting punched information in a card into electrical signals representative of such punched information.

Another object of the instant invention is to provide novel card reader means comprised of sensing fingers for sensing punched holes in a card having means associated with said sensing fingers for converting the positions of said sensing fingers into electrical signals representative of the information obtained by said card.

Another object of the instant invention is to provide novel reading means for reading punched information provided in a card wherein each bit of information has at least three discrete states.

Still another object of the instant invention is to provide novel means for reading information punched in a card comprising a plurality of sensing fingers capable of assuming two or more discrete physical positions or states representative of the bits of information which the sensing finger is reading.

Still another object of the instant invention is to provide novel means for converting information punched in a card into electrical signals comprising printed circuit means associated with sensing members for generating electrical signals representative of the physical position of the associated sensing finger.

Still another object of the instant invention is to provide novel means for reading information punched in a card and converting it into electrical signals comprising novel printed circuit means associated with each of the sensing fingers of the reading means for generating electrical signals representative of the physical position of the associated sensing means and having novel main printed circuit means arranged to make both mechanical and electrical contact with said individual printed circuit means for providing the dual function of coupling the electrical signals to a suitable transmission means and for rigidly supporting said individual printed circuit means.

These and other objects of the instant invention will become apparent when reading the accompanying description and drawings, in which:

FIGURE 1a is a top view of the card reader designed in accordance with the principles of the instant invention.

FIGURE 1b is a sectional view of the card reader of FIGURE 1a taken along the lines A–A' of FIGURE 1a.

FIGURE 1c is a sectional view of the card reader of FIGURE 1a taken along the lines B–B' of FIGURE 1a.

FIGURE 2 is a subassembly view of the card reader of FIGURES 1a through 1c showing the printed circuit means of the view of FIGURE 1c in greater detail.

FIGURE 2a shows the printed circuit of the arrangement of FIGURE 2 taken along the lines C–C' of FIGURE 2.

FIGURE 2b shows a portion of the printed circuit of FIGURE 2 looking in the direction of arrows D–D' of FIGURE 2.

FIGURE 2c is a plan view showing the opposite side of the printed circuit means of FIGURE 2a.

FIGURE 3 is a plan view showing the main printed circuit board of FIGURES 1b, 1c and 2 through 2b in greater detail.

FIGURE 4 is a plan view of a card which may be employed with the card reader of the instant invention.

FIGURES 5a and 5b are side and end views respectively of a left-hand sensing and contact finger assembly as shown in FIGURES 1b and 1c.

FIGURES 6a and 6b are side and end views respectively of a right-hand sensing and contact finger assembly of the type shown in FIGURES 1b and 1c.

FIGURES 7a and 7b are side and bottom views respectively of a printed circuit card holder employed in the assembly of FIGURES 1a through 1c.

FIGURES 8a and 8b are top and end views respectively showing the sensing finger inner guide means of FIGURES 1b and 1c in greater detail.

FIGURES 9a and 9b are top and end views respectively showing the sensing finger outer guide means of FIGURES 1b and 1c in greater detail.

FIGURES 10a and 10b are top and end views respectively showing the sensing finger spring biasing means holder of FIGURES 1b and 1c in greater detail.

Referring now to the drawings, FIGURES 1a through 1c show a card reader 10 designed in accordance with the principles of the instant invention, and which is comprised generally of housing means 11 which, although shown in a fragmentary manner, should be understood to provide suitable housing for the card reader 10.

The card reader 10 is mounted upon a safety plate or bottom plate member 12 which is suspended from the housing 11. For example, in the embodiment shown in FIGURES 1a through 1c, the housing 11 is provided with first and second ledges 11a and 11b such that ledge 11a is provided with an opening 11c and ledge 11b is provided with openings 11d and 11e, best seen in FIGURE 1a, for receiving the bottom plate support members 13. While holding spring section support members 13 are provided with the exemplary embodiment shown, it should be understood that four or more can be provided, if so desired. Bottom plate support member 13 is comprised of an elongated rod 13a threaded at its ends 13b and 13c respectively. Rod 13a is provided with upper and lower shoulders 13d and 13e respectively. Shoulder 13d makes contact with the upper surface of bottom plate 12 in the manner shown in FIGURE 1b. Bottom plate 12 is rigidly secured to support assembly 13 by means of the fastening nut 14 which is tapped so as to make threaded engagement with threaded portion 13c. Upper shoulder 13d of elongated rod 13a acts to position a first end of a spring means 15, the upper end of which bears against the underside of ledge 11a. A second fastening nut 16 threadedly engages the trreaded portions 13b so as to secure elongated rod 13a to housing 11. Spring means 15 permits some movement of the card reader, and further acts to absorb any shocks or jolts which may be imparted to housing 11 so as to prevent any impact from affecting the card reader assembly. All of these support assemblies are substantially identical, like numerals designating like elements, and a description of one of these support assemblies accurately describes the remaining assemblies as well. Therefore, it is seen that bottom plate 12 is suspended from the ledges 11a and 11b of housing 11, and further acts as a platform upon which main elements of the card reader assembly 10 are secured to either directly or indirectly.

Considering FIGURES 1c, 2 and 2a, in conjunction with FIGURE 1b, it is seen that the bottom plate 12 has secured thereto first and second main printed circuit members 17 and 18. Considering FIGURES 1c, 2 and 2a, the main printed circuits 17 and 18 are secured to one another by fastening assemblies 19. Four such assemblies 19 are provided and are located substantially near the corners of the first and second printed circuit boards 17 and 18. Assembly 19 is comprised of an elongated screw member 19a having a head 19b, the underside of which engages the upper surface of the main printed circuits, and elongated cylinder 19c is positioned between circuit boards 17 and 18 so that the elongated screw 19a is fastened to the center of spacer 19c. The lower end of elongated screw 19a threadedly engages a nut 19d. Thus, the boards 17 and 18 are rigidly secured to one another by the fastening assemblies 19, and are further spaced a predetermined distance from one another by means of spacer 19c. It can clearly be seen that the assemblies are substantially identical, with like numerals designating like elements.

After the boards 17 and 18 are so secured to one another, the lower ends of elongated screw member 19a are inserted through suitable apertures provided in bottom plate 12 so as to occupy the positions best seen in FIGURES 1b and 1c. The turning portions of elongated screws 19a threadedly engage a second nut 19e so as to rigidly secure the assembly of FIGURES 2 and 2a to bottom plate 12. Suitable washers 19f may further be provided to lock the nut 19e and retain it in rigid engagement with the screw member 19a.

The main printed circuit boards 17 and 18 further act to make electrical engagement and mechanical engagement with the individual card sensing printed circuit boards 20 through 20j, as best seen in FIGURES 1b and 2 of the drawings, there being 10 such card sensing printed circuit boards. As best seen in FIGURES 2a and 2c, the printed board has a printed circuit on both its surfaces 21, as shown in FIGURE 2a, and 22, as shown in FIGURE 2c. Considering first the surface 21, there are provided thereon first and second terminals 23 and 24 which make electrical engagement with the main printed circuit board 17, in the manner to be more fully described, and which are further connected to terminals 25 and 26 respectively by conductor paths 27 and 28, respectively. Surface 21 is further provided with terminals 29 and 30 which make electrical contact with main printed circuit board 18, in a manner to be more fully described, and which are connected to the terminals 31 and 32 by the conductor paths 33 and 34 respectively. In addition to the above, there are provided two additional terminals 35 and 36 which are electrically connected to one another by means of a common conductor bus 37.

As can be seen from FIGURE 2, the common bus 37 extends through a first opening 38 in each of the printed circuit cards 20 through 20j, and further extends through a second opening 39 in each of the printed circuit cards 20 through 20j. Thus, the common bus 37 is substantially U-shaped, the first end thereof, namely 37a, being electrically secured to the upper surface of main printed circuit card 18. The first arm is threaded through openings 38 in all of the printed circuit cards 20 through 20j. The central portion 37 is located at printed circuit card 20 along the surface 21, and the remaining arm portion of the common bus 37 extending back in the same direction as the first arm in the openings 39 in the cards. All of the terminals 35 and 36 of each of printed circuit cards 20 through 20j will be at the same potential depending upon voltage levels impressed upon the end 37a of common bus 37.

Turning to the opposite surface 22 of each printed circuit card 20 through 20j, it can be seen from FIGURE 2c that the surface 22 may be the mirror image of surface 21. Thus, for example, the terminals 23, 24, 29 and 30 occupy the mirror image positions as designated by the numerals 23', 24', 29' and 30' respectively. In a like manner, all of the remaining elements on surface 22 bear like numerals to the elements on surface 21, with the exception of any numeral which bears a prime. Thus, for example, terminals 23' and 24' make mechanical and electrical engagement with the main printed circuit board 17; terminals 29' and 30' make mechanical and electrical engagement with printed circuit board 18; and the terminals 35' and 36' are connected in common by the common bus 37 in the same manner as the terminals 35 and 36 which appear on the surface 21 of printed circuit board 20. The soldering points at which the common bus 37 is soldered to both surfaces of the printed circuit boards 20 through 20j are designated by the numeral 40. The common bus 37 can best be appreciated from the top view shown in FIGURE 2b, which shows the end 37a and the two extending arms joined in yoke portion 37 to provide a U-shaped configuration. The broken points shown in FIGURE 2b simplifies the fragmentary view depicted therein.

Turning now to FIGURE 1c and FIGURE 1b, the manner in which the sensing finger assembly 41 is secured to the bottom plate 12 will now be described.

The sensing finger assembly is secured to the bottom plate 12 by means of first and second mechanism support assemblies 42, 42, which can best be seen in FIGURE 1c. Since both assemblies are substantially identical, like numerals designate like elements. Each assembly 42 is comprised of an elongated rod 42a having a shoulder 42b at the lower end thereof which bears against the upper surface of bottom plate 12. The extreme lower end 42c is suitably threaded so as to threadedly engage a tapped aperture in nut 43. A suitable washer means 44 is also provided. The second shoulder means 42d is provided on each elongated rod 42a so as to bear against and thereby support a printed circuit card holder member 45. The card holder member 45 is shown in detail in FIGURES 7a and 7b and is a substantially solid elongated member having first and second apertures 46 and 47 for receiving the portions 42e of the mechanism support assemblies 42. The card holder member 45 is provided with a plurality of substantially similar grooves 48 positioned at spaced intervals along the holder member 45 so as to receive the upper edge 49 of each printed circuit card 20 through 20j in the manner shown in FIGURE 11c. The printed circuit car holder means 45 thereby acts to rigidly position and secure the printed circuit boards 20 through 20j relative to one another so that they maintain their positions at the spaced intervals, as shown.

Positioned immediately above the card holder member 45 is a sensing finger outer guide member 50 which is shown in FIGURES 1b and 1c, but which can best be seen in FIGURES 9a and 9b. The outer guide member is a substantially flat, rectangularly shaped member having first and second apertures 51 and 52 to receive the cylindrical portions 42e of the support assemblies 42, 42. Member 50 is provided with a substantially large, rectangular shaped opening 53 which receives the sensing fingers therebetween and acts to guide the fingers so as to limit their freedom of motion in a manner to be more fully described.

Positioned immediately above the sensing finger outer guide member 50 is a sensing finger inner guide member 54 which, although shown in FIGURES 1b and 1c, is shown in greater detail in FIGURES 8a and 8b. The sensing finger inner guide member 54 is a substantially flat, elongated member provided with apertures 55 and 56 for receiving the cylindrical portions 42e of the mechanism support assembles 42, 42. The third and fourth apertures 57 and 58 respectively are provided for receiving the credit card guide members to be more fully described. The flat member 54 is still further provided with a plurality of elongated slots 59 arranged in groups 60 and 61 on opposite sides of member 54 for the purpose of receiving and thereby guiding the sensing fingers. Since, in the particular embodiment described herein, there are provided first and second groups of sensing fingers with each of said groups having 20 sensing fingers, this necessitates the design of the inner guide member 54 so as to provide 20 such slots in each of the groups 60 and 61, respectively. It should be understood that in cases where a greater or lesser number of sensing fingers are desired, a greater or lesser number of such notches or slots 59 may be provided.

Immediately above the sensing finger inner guide member 54, there are provided spacer members or cylinders 62, 62 with the cylinders, or spacers 62 receiving the cylindrical portions 42e of the assembly 42 therethrough. Immediately above each spacer 62 is provided a second sensing finger outer guide member 50' which is substantially identical to the sensing finger outer guide member 50, shown in FIGURES 9 and 9a in detail, and described in detail above. Positioned immediately above the sensing finger second outer guide member 50' is a second sensing finger inner guide member 54' which is substantially identical to the inner guide member 54, shown in FIGURES 8a and 8b, which was described previously.

Positioned immediately upon the second inner guide member 54' is a spring holder member 53 which is best seen in FIGURES 10a and 10b. The spring holder member 63 is a flat, substantially rectangular member having first and second apertures 64 and 65 respectively for receiving the cylindrical portions 42e of the assemblies 42, 42. A substantially large, rectangular opening 66 is provided in member 63 to permit the passage of the sensing fingers therethrough. Positioned along the elongated side of member 63 are first and second groups 67 and 68 of openings 69 provided for the purpose of securing the upper ends of spring members (to be more fully described) which bias the sensing fingers. This entire assembly is held in rigid securement by means of a screw member 69 which threadedly engages a tapped opening 42f provided in the elongated support rod 42a. The screw 69 is held in locked engagement by means of a washer member 70. Thus, the entire guiding assembly is comprised of the card holder 45, outer guide 50, inner guide 54, spacers 62, 62, second outer guide 50', second inner guide 54' and spring holder member 63 being held rigidly between the screw member 69 and the shoulders 42d provided on the elongated rods 42a.

The sensing fingers and the manner in which they operate can best be understood from a consideration of FIGURES 1b, 1c, 5a, 5b, 6a, and 6b, as well as the top view of FIGURE 1a. Considering first FIGURE 1a, a credit card 71 is shown in phantom line fashion, which card is provided with first and second rows 72 and 73 respectively of elongated slots 74. There are 20 slots 74 in each of rows 72 and 73, thus providing a total of 40 such slots 74. Thus, from the point of view of data provided in card 71, there are a total of 40 bits of information which may be stored in the card 71, these bits being sensed by a total of 40 sensing fingers. The sensing fingers are broken up into first and second groups 74 and 75 respectively, as shown in FIGURE 1b, for the purpose of reading the rows 72 and 73 respectively. The sensing fingers of group 74 are hereinafter designated the right-hand sensing finger members, while the sensing fingers comprising group 75 are hereinafter referred to as the left-hand sensing finger members. Considering first the right-hand sensing finger group, each sensing finger in the group has a configuration, as shown in FIGURES 6a and 6b. Such a right-hand sensing finger assembly 76 is compirsed of elongated sensing finger 77 having first and second shoulders 78 and 79 respectively at its upper end so as to form an irregularly shaped nose portion having a first extreme portion 80 having a thickness $D_1$, and a second portion 81 having a thickness $D_2$, with the remaining portion of the sensing fingers 77 having a thickness $D_3$. The lower end of the sensing finger 77 is provided with a hook portion 82 for receiving one end of a spring means in a manner to be more fully described, and is further provided with at least two suitable apertures for receiving the eyelet members 83. The eyelet members 83 act to rigidly position and secure a contact finger member 84 to the sensing finger member 77. The contact finger member 84 is bent in the fashion shown in FIGURE 6b, forming an upper portion 85 having suitable apertures for receiving eyelets 83 which may, for example, be rivet-type eyelets to rigidly secure the contact finger and sensing finger to one another. The lower portion of the contact finger 84 is arranged to provide first, second and third arms 86 through 88 respectively, which are so arranged as to make wiping contact with the terminals 35, 25 and 31 respectively of printed circuit surface 21, as shown in FIGURE 2a. Each of the fingers 86 through 88 are bent at the position 89, as shown in FIGURE 6b, so as to form a substantially curved contact surface which makes engagement with the terminals of the printed circuit boards 20 through 20j.

Returning to FIGURE 1b, each of the right-hand sensing finger assemblies 76 of FIGURES 6a and 6b are mounted in the position shown in FIGURE 1b, so that the upper end thereof projects in the upward vertical direction so that the contact fingers 86 through 88 make wiping contact with the terminals 35, 25 and 31 in the manner shown in the figures. The left-hand edge 90 of right-hand assembly 76 bears against the outer guide members 50 and 50', thus preventing the fingers from moving horizontally to the left, as shown in FIGURE 1b. The right-hand edges 91 of the right-hand assembly 76 bear against the seat of each of the slots 59 provided in the inner guide members 54 and 54' so as to prevent sensing finger assembly 76 from moving horizontally to the right. Thus, inner 54–54' and outer 50–50' guide members limit the movement of the right-hand finger assembly 76 in the vertical direction either upwardly or downwardly.

As shown in FIGURE 1b, the hook portion 82 of assembly 76 acts to secure the lower end 92a of a spring member 192. The upper end 92b of spring member 92 is positioned and secured by one of the apertures 69 provided in the spring holder member 63. The spring members 92 act to urge the right-hand assemblies 76 in the upward vertical direction, as shown by arrow 93 in FIGURE 1b. Unlimited upward movement is restrained by virtue of the engagement between under surface of outer guide member 50 and the shoulder or ledge 77a provided on elongated sensing finger 77. Note FIGURES 1b and 6a.

The sensing finger assemblies of the left-hand side are shown in FIGURES 5a and 5b. These members are substantially the mirror image of the left-hand assembly 76. They have been designated by the numeral 76' and all like elements of each assembly 76' to the assembly 76 bear like numerals, with the addition, however, of a prime to each numeral. Thus, turning to the FIGURES 5a and 5b, and to FIGURE 1b, the left-hand assemblies 76' are mounted in a substantially identical manner with the arms 86' through 88' making wiping contact with the terminals 36 and 32 of printed circuit board 20 with the hook portion 82' securing one end 92a' of a spring member 92' and with the right and left-hand edges 90' and 91' respectively being restrained against any horizontal movement by the outer 50–50' and inner 54–54' guide members.

In order to correctly position the credit card 71 to be sensed by the sensing finger groups 74 and 75, the card reader 10 is provided with first and second credit card guide assemblies 100, 100 which is best seen in FIGURES 1b and 1c. The assembly 100 is comprised of an elongated rod 101 having a flange 102 intermediate the ends thereof. Each elongated rod 101 is designed to pass through the openings 57 and 58 in inner guide members 54 and 54' respectively. The flanges 102 are positioned so that their upper surfaces bear against the underside of the second inner guide member 54' in the manner shown in FIGURE 1c. A spring means 103 is wound about each elongated member 101 so that its upper end 103a bears against the underside of flange 102 and so that its lower end 103b bears against the upper surface of inner guide member 54. This arrangement causes spring member 103 to urge the credit card guide assembly 100 in the upper vertical direction, as shown by the arrows 104.

The upper end of each rod 101 is provided with a tapered point 105 positioned above the ledge 106. The points 105 cooperate with suitable apertures 107 and 108 provided in the credit card 71, as shown in FIGURE 1a, so as to correctly position the credit card 71 over the sensing finger groups 74 and 75.

FIGURE 4 shows the credit card 71 in greater detail. The credit card 71 may be formed of any standard plastic or other stiff material presently employed in the manufacture of such cards and provided with a region 109 which may be employed for the purpose of receiving information in the form of slots punched into the card in region 109. The openings 107 and 108 are arranged in the region 109 and are adapted to receive the pin portions 105 of the guide member assemblies 100 in order to accurately position the credit card 71 above the card reader assembly 10. As was previously described, the information is punched into card 71 in a regular fashion so that any information punched into the card is confined to the two rows 72 and 73 and the 20 columns 1 through 20 arranged in the manner shown in FIGURE 4. The information punched into the card takes the form of 40 individual bits, there being 20 columns in two rows, thus giving a total of 40 positions or bits which may be punched in region 109 of credit card 71. Each bit may exist in any one of three discrete steps. As a first example, consider the intersection 111 between row 72 and column 7. There is no punch whatsoever at this position, this meaning the bit at this position takes the form of a no-punch condition or state. The intersection 112 between row 73 and column 20 is provided with a slot 113, the length of which is designated by the letter D. Thus, a second state which the bit may assume is a slot having the length D. The intersection between row 72 and column 1, namely, intersection 114, is provided with an elongated slot 115 having a length $D_1$ substantially greater than the length D of slot 113. The width of the slots 113 and 115 are substantially equal, this particular transverse dimension not being employed for the purpose of representing the state of a bit of information. Thus, it can be seen that in the embodiment described herein, each of the 40 bit positions is capable of assuming three discrete states, namely, no-punch, a punch having length D, and a punch having length $D_1$. This means that each bit is capable of having three states, thus making it a ternary bit, there being 40 such bits of information. The credit card 71 of FIGURE 4 is thus capable of forming $3^{40}$ different combinations of data in the ternary code. This is an extremely large number. To appreciate its size, 3 raised to the 13th power provides better than 1,500,000 combinations, and 3 raised to the 13th power relative to 3 raised to the 40th power is, comparatively speaking, an extremely small number. Thus, it can be seen that a card of the design shown in FIGURE 4 provides an extremely vast number of combinations more than adequate to provide individual card holders with his or her own identifying code number. While the card 71 of FIGURE 4 is provided with 40 such bits of information, it should be understood that a card having a greater or lesser number of bits may be provided, depending only upon the needs of the user. In addition thereto, while the card of FIGURE 4 is designed to provide a three state or ternary code, it should be understood that by providing slots of greater discrete lengths at each of the bit locations, or by providing either a slot or no-slot condition, the code utilized may be a four state (quaternary) or two state (binary) code with the ultimate code selected depending only upon the needs of the user. Usually the deciding factor is the number of individual card holders which may be present in any given system.

The operation of the card reader assembly 10, in reading a credit card 71, is as follows:

The imprinter in which the card reader assembly 10 is mounted is normally provided with a pivoted cover or lid 115, shown in sectional fashion in FIGURE 1b, which is pivoted at 116 to the housing 11. The cover member 115 is normally in the position shown in FIGURE 1b. In this position, the credit card 71 is positioned above the card reader assembly 10 so that the apertures 107 and 108 receive the heads 105 of the guiding assemblies 100. This is shown in FIGURE 1b with the credit card 71 being shown in dotted line fashion. In this position, the credit card 71 has its underside positioned a slight distance above the extreme top ends of the sensing fingers in groups 74 and 75. The reading operation is performed by rotating the pivotally mounted cover 115 in the counterclockwise direction, as shown by arrow 117, so as to bring the underside 115 thereof down upon the surface of credit card 71.

This causes credit card 71 to be moved vertically downward in the direction shown by arrow 118. Initially, this causes the guide assemblies 100 to move vertically downward against the normal biasing force of spring members 103. As soon as the ledges 106 of the guide means 100 move below the uppermost edges of the sensing finger assemblies 76 and 76', the credit card 71 will then make physical contact with selected ones of the left-hand and right-hand sensing finger assemblies. For example, in bit positions where no punch or slot is provided, the surface of the card will urge the sensing finger associated with that bit position in the downward direction. In bit positions where slots of the length D are provided, these slots will receive the uppermost position 80 (see FIGURES 5a and 6a) of the sensing fingers 77 (or 77', as the case may be) since the thickness $T_1$ of the portion 80 is less than the length D of the slot. However, the shoulder 78 of the sensing finger 77 will bear against the underside of the credit card 71 so that the sensing finger assembly will move downward a predetermined distance, which distance will be less than the downward movement of a sensing finger which senses a no-punch condition in the card 71.

In the case where a slot having the length $D_1$ is provided in credit card 71, the sensing finger portions 80 and 81 will both pass through the slots, since the thicknesses $T_1$ and $T_2$ are both less than the length $D_1$ of the slot 115, for example, as shown in FIGURE 4. Thus, when the credit card 71 moves to its downwardmost position 71', shown in FIGURE 1b, the underside of the card 71' rests against the shoulder 79 of the sensing finger assembly 76, resulting in the sensing finger assembly experiencing no downward vertical motion whatsoever. Reviewing the three possible bit states of information, in the case where the digit positions are provided with elongated slots of length $D_1$, the sensing finger experiences no downward vertical motion whatsoever, and occupies the physical position A, as shown in FIGURE 1b, such that the contact fingers 86, 87 and 88 make electrical engagement with the electrical terminals 35, 25 and 31 respectively. In the next bit position, when the slot which is provided has a length D, the sensing finger undergoes downward vertical movement until it reaches the physical position B. In this position, the contact fingers 86 and 87 make electrical engagement with the terminals 35 and 25 respectively, but the contact finger 88 is electrically insulated (i.e. disengaged) from the terminal 31.

In the third possible bit state, when no punch whatsoever is provided in the card, the sensing finger undergoes its maximum downward vertical movement to occupy the physical position C such that contact finger 86 makes electrical engagement with terminal 35, while contact arms 87 and 88 are electrically insulated (i.e. disengaged) from the electrical terminals 25 and 31 respectively. With a B+ voltage being impressed upon the terminal 35, the possible bit states of information in the credit card 71 are converted into electrical states such that the electrical terminals 29 and 23 are both at B+ potential when no punch appears in the credit card 71; only terminal 23 is at B+ potential when a slot having the length D is present in the credit card 71; and neither terminal 23 nor 29 is at B+ potential when credit card 71 is provided with a slot having the length $D_1$.

The left-hand sensing finger assemblies 72 operate in the identical manner so as to provide the combinations of B+ potential at both terminals 24 and 30; at only terminal 24; and at neither of the terminals 24 and 30 in order to electrically represent the three states of the bit of information being sensed.

Turning to FIGURE 1c, it can be seen that the sensing finger assemblies are arranged so as to make wiping contact with both sides of the printed circuit boards 20 through 20j, it being clearly seen from FIGURES 2a and 2c that each of said printed circuit cards are provided with circuits on both surfaces thereof. Thus, for example, in the view shown in FIGURE 1c, the group 74 is visible in this figure. Every other sensing finger assembly of the group 74 is a right-hand assembly, while the remaining sensing fingers are left-hand assemblies 76'. This is true because the right-hand surfaces of the printed circuit cards 20 through 20j have their opposite sides being mirror images of one another, thus necessitating the arrangement of the sensing fingers to likewise be mirror images of one another. This is likewise true of the sensing finger group 75.

To recapitulate, the relationship between the punched information in the credit card 71 and the electrical information into which the punched information is converted is set forth in chart form below:

| Card Bit State | Terminal | |
| --- | --- | --- |
|  | 23 | 29 |
| No Punch | 0 | 0 |
| Punch-length D | B+ | 0 |
| Punch-length $D_1$ | B+ | B+ |

From the above chart it can be seen that for each bit of information in the credit card 71 there are two corresponding electrical terminals, each being capable of assuming one of two binary states, namely a B+ state or a zero voltage state. Since there is a total of 40 such bits in the credit card 71, this means that there are a total of 80 terminals which bear binary information (i.e. two-state information) in the form of electrical signals representative of the three-state information punched into the credit card 71. These 80 terminals are arranged such that each of the printed circuit cards 20–20j (there being ten such cards) have circuits printed on both of their opposing surfaces, each of said circuits having a total of four terminals. Considering FIGURE 2a, for example, the terminals on the one surface are 23, 24, 29 and 30. The opposite surface has the four terminals 23', 24', 29' and 30'. Thus, with each card having eight terminals per card and a total of eight cards, this gives a total of 80 terminals, all being of the type shown in FIGURES 2a and 2c. It is now necessary to couple all of these terminals bearing two-state electrical information to a suitable transmitter means so that the information may be transmitted from the remote location to a central processing point. Typical transmitter means which may be employed in conjunction with the instant invention are set forth in the U.S. Patents Nos. 3,219,758 and 3,196,213, and the previously mentioned U.S. Patent No. 3,328,758. Patent No. 3,219,758 describes a transmitter means which sequentially steps out binary information presented to the transmitter in parallel fashion. The transmitters of the Patents, No. 3,196,213 and No. 3,328,758, are somewhat similar in that they function to sequentially transmit binary information presented in parallel fashion to a remote location.

With the arrangement of FIGURE 2a, it can be seen that an enormous number of wires and connections would be required to connect the eight contacts of each printed circuit board to the input terminals of the transmitter means. Such a complex and tedious connecting arrangement is avoided in the instant invention by providing the main printed circuit boards 17 and 18, shown in FIGURES 1b, 1c and 2–2b with a detailed view of one of said printed circuit boards being shown in FIGURE 3.

Turning specifically to FIGURE 3, there is shown therein the main printed circuit board 17, it being understood that the printed circuit board 18 is substantially identical to board 17 so that a description of only one board will be given herein for purposes of simplicity.

The printed circuit board 17 as shown in FIGURE 3 is formed from a substantially flat insulating member having opposing substantially rectangular shaped surfaces 17a and 17b (see FIGURE 2), only the top surface 17a being visible in FIGURE 3. The printed circuit is deposited on the board 17 in any well known fashion with the particular method being employed lending no novelty to the arrangement of the instant invention. The board is provided with apertures 130a–130d, which are provided for the purpose of receiving the four fastening assemblies 19 which were previously described and which can best be seen in FIGURE 2. Considering the view of board 17 from FIGURE 3, the top edge 131 thereof is provided with a plurality of elongated slots 133. There are ten such slots provided along edge 131 for the purpose of receiving the left-hand leg 133 (see FIGURE 2a) of each of the individual printed circuit boards 20–20j. The bottom edge 134 of main card 17 is also provided with a plurality of slots 135 arranged to receive the right-hand leg 136 (see FIGURE 2a) of each of the individual printed circuit cards 20–20j.

Considering first the top surface 17a of main printed circuit card 17, there is provided a printed circuit thereon which is comprised of a first group of conductive terminals 137–137j, which are arranged to make electrical contact with all of the terminals in the position of the terminal 30 of surface 21 of printed circuit board 20, shown in FIGURE 2a. The conductive terminal 137 of main board 17 is soldered to the conductive terminal 24 of printed circuit board 20 at the point 141 shown in both FIGURES 2a and 2. All of the other terminals of boards 20a–20j occupying substantially the same position as terminal 24 of board 20 are soldered in like fashion to the terminals 137a–137j respectively, at the points 142.

When the opposite side of each of the slots 135 is a second group of conductive terminals 138–138j, considering the terminal 138, it makes electrical contact with the conductive terminal 24' on surface 22 of printed circuit card 20, shown in FIGURE 2c. The two terminals 138 and 24' are soldered at 143, shown in FIGURE 2. The remaining boards 20a–20j have the terminals occupying substantially the same location as terminal 24' soldered to the respective conductive terminals 138a–138j at the location 144 shown in FIGURE 2. Thus, along edge 134 of main printed circuit board 17 all of the terminals occupying the position of terminals 24 and 24' are electrically connected to the group of conductive terminals 137–137j and 138–138j.

All of these conductive terminals 137–137j and 138–138j are brought out via suitable conductive paths 145 to the group of terminals 146–146j and 147–147j respectively. It can be noted that the terminals 146–146j and 147–147j appearing along the right-hand edge 148 of card 17 are interspersed in a regular fashion.

The remaining terminal 149 appearing on surface 17a and immediately beneath terminal 147j is electrically connected by the conductive path 150 to a terminal 151 having a central aperture 152. This central aperture receives the common bus 137 which can best be seen in FIGURES 2 and 2b. Terminal 149 is electrically connected in any suitable manner to a B+ power supply so as to electrically connect the B+ voltage level to common bus 37 shown in FIGURES 2, 2a and 2b.

Considering the reverse or underside 17b of main board 17, which can also be seen in FIGURES 2 and 2a, the underside is provided with a printed circuit pattern which is substantially identical to, but is a mirror image of the printed circuit pattern on surface 17a of board 17. Most of the printed circuit pattern on the underside 17b is shown in dotted line fashion in FIGURE 17. Turning to description thereof, adjacent and on the left-hand side of each of the slots 132 is provided a group of conductive terminals 139–139j substantially identical to the terminals 137–137j. On the right-hand side of slots 132 are provided a group of conductive terminals 140–140j substantially identical to the conductive terminals 138–138j described previously. Each of these terminal groups 139–139j and 140–140j are connected by suitable conductive paths 154, shown in dotted fashion, which paths are substantially identical to the conductive paths 145 so as to lead out to electrical terminals which are identical in function and configuration to the electrical terminals 146–146j and 147–147j. As one example, consider the conductive terminal 139. This terminal is connected by the conductive path 154' to a conductive terminal which lies immediately beneath the conductive terminal 147j and on the opposite side of the board 17. In a like manner, the conductive terminal 140j is connected by the conductive path 154" to a terminal which lies on the opposite side of board 17 immediately beneath conductive terminal 146. The underside terminals have therefore been placed in (alongside the top side terminals) and have been given primes to designate the fact that they are on the underside of board 17, Thus, terminal 139 is electrically connected to terminal 146', shown in parenthesis. Terminal 140j is electrically connected to terminal 147j', as shown in parenthesis, and so forth. Considering both FIGURE 3 and FIGURE 2a, it can be seen that the underside terminal 139 is electrically connected to conductive terminal 23 of individual printed circuit board 20 and is soldered at 156. The remaining underside terminals 139–139j and 140–140j are soldered to the like terminals of the remaining boards 20a–20j respectively.

Turning to a consideration of board 18, this board is identical in function and arrangement to the board 17 shown in FIGURE 3 and hence a detailed description thereof will be omitted for the purposes of simplicity. However, turning to FIGURES 2 and 2a, it can be seen that main printed circuit board 18, having upper and lower surfaces 18a and 18b, is electrically connected to the terminals 29 and 30 in a manner substantially identical to the connections between printed circuit board 17 and the conductive terminals 23 and 24.

Tracing through one particular data bit position in the credit card to the terminals along the right-hand surfaces 148 of printed circuit boards 17 and 18 (see FIGURE 3) the paths are as follows:

Considering FIGURES 1a and 1b, let us now trace the path of the data position 157, shown in credit card 71 of FIGURE 1a. Turning to FIGURE 1b it can be seen that this data bit position is mechanically coupled through a sensing finger assembly 76 to the terminals 35, 25 and 31 of surface 21 on printed circuit board 20 shown in FIGURE 2a. The terminals 25 and 31 are connected by suitable conductive paths 27 and 33 respectively, to the conductive terminals 29 and 23. The conductive terminals 29 and 23 are electrically connected to the undersides 18b and 17b respectively, of printed circuit boards 18 and 17. Thus, terminal 23 is connected to conductive terminal 139 of FIGURE 3, which in turn, leads out to the conductive terminal 147' present on the underside of printed circuit board 17. The terminal to which the conductive terminal 29 of board 20, shown in FIGURE 2a, is connected will occupy substantially the identical position as the terminal 146' of printed circuit board 17. Thus the two output terminals representative of the data bit position 157 of credit card 71 shown in FIGURE 1a are positioned immediately above one another on the main printed circuit cards 17 and 18. In a like fashion, the other terminal pairs are arranged one above the other, thus greatly simplifying the connection of all 80 terminals to a suitable transmitter means. As can be seen, main printed circuit board 17 of FIGURE 3 is provided with 20 such terminals 146–146j and 147–147j on its top surface and an additional 20 such terminals 146'–146j' and 147'–147j' on its reverse side thus providing a total of 40 terminals. Board 18 provides an additional 40 terminals, thus giving the total of 80 terminals or 40 terminal pairs representative of the 40 bit positions in credit card 71.

The coupling between the 40 terminal pairs on printed circuit boards 17 and 18 and a suitable transmitter means (not shown) may be done in any suitable fashion such as, for example, especially adapted amphenol plugs which are designed to simply and readily plug in to the right-hand ends of boards or flexible printed circuits, cables and the like, to the transmitter means in order to transmit the 80 binary bits of information to the central location representative of the 40 bits of three-state information provided in the credit card 71.

From the arrangement of the main board 17 and 18, it can be seen that in addition to providing electrical connection between main boards 17 and 18 and individual boards 20–20j, the slots 135 and 132 provided in these boards act to rigidly support and maintain the boards 20–20j at the predetermined spaced intervals as shown clearly in FIGURE 2, to provide a compact and sturdily built three-dimensional printed circuit arrangement for the card reader of the instant invention.

It can therefore be seen that the instant invention provides a novel electromechanical card reader device for simultaneously sensing multiple state bit information in the form of punches in a card and converts all of this physical presented information into a plurality of two-state electrical signal groups which are immediately available for transmission to a remote point. The card reader of the instant invention is simple in design, low in cost, compact and highly reliable, thus enabling its mass use in system requiring huge quantities of such card reader devices.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. Means for reading data presented in a document in punched fashion comprising; a plurality of sensing means each aligned with an associated data bit position in the document; biasing means for urging all of said sensing means in a first direction; each of said sensing means comprising first means for engaging a data bit location when said document is placed on said reading means; said first means adapted to move said sensing means to at least two discrete positions depending on the state of the associated data bit; a source of voltage; second means having first and second terminals arranged to make contact wtih said sensing means; said first terminal connected to said voltage source; said second terminal having a length unequal to said first contact; said sensing means further comprising third means for bridging said first and second terminals when said sensing member is in one of said two discrete positions.

2. Means for reading data presented in a document in punched fashion comprising; a plurality of sensing means each aligned with an associated data bit position in the document; biasing means for urging all of said sensing means in a first direction; each of said sensing means comprising first means for engaging a data bit location when said document is placed on said reading means; said first means adapted to move said sensing means to at least two discrete positions depending on the state of the associated data bit; a source of voltage; second means having first and second terminals arranged to make contact with said sensing means; said first terminal connected to said voltage source; said second terminal having a length unequal to said first contact; said sensing means further comprising third means for bridging said first and second terminals when said sensing member is in one of said two discrete positions; said third means isolating said first and second contacts when said sensing member is in the other of said two discrete positions.

3. Means for reading data presented in a document in punched fashion comprising; a plurality of sensing means each aligned with an associated data bit position in the document; biasing means for urging all of said sensing means in a first direction; each of said sensing means comprising first means for engaging a data bit location when said document is placed on said reading means; said first means adapted to move said sensing means to at least two discrete positions depending on the state of the associated data bit; a source of voltage; second means having first and second terminals arranged to make contact with said sensing means; said first terminal connected to said voltage source; said second terminal having a length unequal to said first contact; said sensing means further comprising third means for bridging said first and second terminals when said sensing member is in one of said two discrete positions; said second means having a third terminal unequal in length to said first and second terminals; said third means bridging said first, second and third terminals when said sensing means is in one of said two discrete positions; and bridging said first and second terminals when said sensing means is in the other of said discrete positions.

4. Means for reading data presented in a document in punched fashion comprising; a plurality of sensing means each aligned with an associated data bit position in the document; biasing means for urging all of said sensing means in a first direction; each of said sensing means comprising first means for engaging a data bit location when said document is placed on said reading means; said first means adapted to move said sensing means to at least two discrete positions depending on the state of the associated data bit; a source of voltage; second means having first and second terminals arranged to make contact with said sensing means; said first terminal connected to said voltage source; said second terminal having a length unequal to said first contact; said sensing means further comprising third means for bridging said first and second terminals when said sensing member is in one of said two discrete positions; said second means having a third terminal unequal in length to said first and second terminals; said third means bridging said first, second and third terminals when said sensing means is in one of said two discrete positions; and bridging said first and second terminals when said sensing means is in the other of said discrete positions; fourth means for supporting said second means; said fourth means including means electrically connected to said first, second and third terminals for connecting said terminals to an output device to transmit the signal levels to a remote location.

5. Means for reading data presented in a document in punched fashion comprising; a plurality of sensing means each aligned wtih an associated data bit position in the document; biasing means for urging all of said sensing means in a first direction; each of said sensing means comprising first means for engaging a data bit location when said document is placed on said reading means; said first means adapted to move said sensing means to at least two discrete positions depending on the state of the associated data bit; a source of voltage; second means having first and second terminals arranged to make contact with said sensing means; said first terminal connected to said voltage source; said second terminal having a length unequal to said first contact; said sensing means further comprising third means for bridging said first and second terminals when said sensing member is in one of said two discrete positions; said second means being a printed circuit board having first and second printed circuit terminals.

6. A reading means comprising a plurality of first printed circuit boards of the type described in claim 5 associated with each of said sensing means recited in claim 5 and further comprising second printed circuit means having slot means for positioning and securing said first plurality of printed circuit boards and further having individual printed circuit paths adjacent each of said slot means to make electrical contact with said first, second and third terminals; said individual printed circuit paths arranged to align present the signals of all of said terminals along one side of said second printed circuit means.

7. Means for reading data presented in a document in punched fashion comprising; a plurality of sensing means each aligned with an associated data bit position in the document; biasing means for urging all of said sensing means in a first direction; each of said sensing means comprising first means for engaging a data bit location when said document is placed on said reading means; said first means adapted to move said sensing means to at least two discrete positions depending on the state of the associated data bit; a source of voltage; second means having first and second terminals arranged to make contact with said sensing means; said first terminal connected to said voltage source; said second terminal having a length unequal to said first contact; said sensing means further comprising third means for bridging said first and second terminals when said sensing member is in one of said two discrete positions; said second means having a third terminal unequal in length to said first and second terminals; said third means bridging said first, second and third terminals when said sensing means is in one of said two discrete positions; and bridging said first and second terminals when said sensing means is in the other of said discrete positions; said second means being a printed circuit board having first, second and third printed circuit terminals.

8. Means for reading data presented in a document in punched fashion comprising; a plurality of sensing means each aligned with an associated data bit position in the document; biasing means for urging all of said sensing means in a first direction; each of said sensing means comprising first means for engaging a data bit location when said document is placed on said reading means; said first means adapted to move said sensing means to at least two discrete positions depending on the state of the associated data bit; a source of voltage; second means having first and second terminals arranged to make contact with said sensing means; said first terminal connected to said voltage source; said second terminal having a length unequal to said first contact; said sensing means further comprising third means for bridging said first and second terminals when said sensing member is in one of said two discrete positions; said second means having a third terminal unequal in length to said first and second terminals said third means bridging said first, second and third terminals when said sensing means is in one of said two discrete positions; and bridging said first and second terminals when said sensing means is in the other of said discrete positions; fourth means for supporting said second means; said fourth means including means electrically connected to said first, second and third terminals for connecting said terminals to an output device to transmit the signal levels to a remote location; said fourth means being a printed circuit board having a plurality of printed circuit paths electrically connected to said first, second and third terminals, respectively.

9. Means for reading data presented in a document in punched fashion comprising; a plurality of sensing means each aligned with an associated data bit position in the document; biasing means for urging all of said sensing means in a first direction; each of said sensing means comprising first means for engaging a data bit location when said document is placed on said reading means; said first means adapted to move said sensing means to at least two discrete positions depending on the state of the associated data bit; a source of voltage; second means having first and second terminals arranged to make contact with said sensing means; said first terminal connected to said voltage source; said second terminal having a length unequal to said first contact; said sensing means further comprising third means for bridging said first and second terminals when said sensing member is in one of said two discrete positions; said second means having a third terminal unequal in length to said first and second terminals said third means bridging said first, second and third terminals when said sensing means is in one of said two discrete positions; and bridging said first and second terminals when said sensing means is in the other of said discrete positions; fourth means for supporting said second means; said fourth means including means electrically connected to said first, second and third terminals for connecting said terminals to an output device to transmit the signal levels to a remote location; said fourth means being a printed circuit board having a plurality of printed circuit paths electrically connected to said first, second and third terminals, respectively; said printed circuit board having slotted means for receiving and supporting said second means.

10. Means for reading data presented in a document in punched fashion comprising; a plurality of sensing means each aligned with an associated data bit position in the document; biasing means for urging all of said sensing means in a first direction; each of said sensing means comprising first means for engaging a data bit location when said document is placed on said reading means; said first means adapted to move said sensing means to at least two discrete positions depending on the state of the associated data bit; a source of voltage; second means having first and second terminals arranged to make contact with said sensing means; said first terminal connected to said voltage source; said second terminal having a length unequal to said first contact; said sensing means further comprising third means for bridging said first and second terminals when said sensing member is in one of said two discrete positions; each of said sensing means comprising an elongated member having a first end engaging said document; said first end being tapered in discrete steps to form first and second shoulders on opposite sides thereof; said shoulders being located at unequal distances from the tip of said elongated member.

11. Means for reading data presented in a document in punched fashion comprising; a plurality of sensing means each aligned with an associated data bit position in the document; biasing means for urging all of said sensing means in a first direction; each of said sensing means comprising first means for engaging a data bit location when said document is placed on said reading means; said first means adapted to move said sensing means to at least two discrete positions depending on the state of the associated data bit; a source of voltage; second means having first and second terminals arranged to make contact with said sensing means; said first terminal connected to said voltage source; said second terminal having a length unequal to said first contact; said sensing means further comprising third means for bridging said first and second terminals when said sensing member is in one of said two discrete positions; each of said sensing means comprising an elongated member having a first end engaging said document; said first end being tapered in discrete steps to form first and second shoulders on opposite sides thereof; said shoulders being located at unequal distances from the tip of said elongated member; a two-pronged member secured to second end of said elongated member; the first and second prongs of said two-pronged member being arranged to make wiping contact with said first and second terminals.

12. Means for reading data presented in a document in punched fashion comprising; a plurality of sensing means each aligned with an associated data bit position in the document; biasing means for urging all of said sensing means in a first directiton; each of said sensing means comprising first means for engaging a data bit location when said document is placed on said reading means; said first means adapted to move said sensing means to at least two discrete position depending on the state of the associated data bit; a source of voltage; second means having first and second terminals arranged to make contact with said sensing means; said first terminal connected to said voltage source; said second terminal having a length unequal to said first contact; said sensing means further comprising third means for bridging said first and second terminals when said sensing member is in one of said two discrete positions; each of said sensing means comprising an elongated member having a first end engaging said document; said first end being tapered in discrete steps to form first and second shoulders on opposite sides thereof; said shoulders being located at unequal distances from the tip of said elongated member; a two-pronged member secured to second end of said elongated member; the first and second prongs of said two-pronged member being arranged to make wiping contact with said first and second terminals; means for securing said bias means to said elongated member to bias said sensing means toward contact with said document.

References Cited
UNITED STATES PATENTS

| | | | |
|---|---|---|---|
| 941,892 | 11/1909 | Soulage | 235—61.9 |
| 1,984,516 | 12/1934 | Brougham | 235—61.11 X |
| 2,110,854 | 3/1938 | Fuller et al. | |
| 2,113,634 | 4/1938 | Tauschek | 235—61.11 |
| 2,169,213 | 8/1939 | Backdahl | 235—61.11 |
| 2,673,033 | 3/1954 | Gruver | 235—61.12 X |
| 2,704,187 | 3/1955 | Beach et al. | 235—61.12 |
| 2,272,411 | 2/1942 | Johnson | 235—61.6 |

DARYL W. COOK, *Primary Examiner.*